(12) United States Patent
Kiel et al.

(10) Patent No.: US 7,273,230 B2
(45) Date of Patent: Sep. 25, 2007

(54) TENSION SHACKLE X-BRACE

(75) Inventors: Kevin Henry Kiel, Ann Arbor, MI (US); Stephen Bishop Provost, IV, Phoenix, AZ (US)

(73) Assignee: Toyota Technical Center USA, Inc., Ann Arbor, MI (US)

( * ) Notice: Subject to any disclaimer, the term of this patent is extended or adjusted under 35 U.S.C. 154(b) by 481 days.

(21) Appl. No.: 10/839,066

(22) Filed: May 5, 2004

(65) Prior Publication Data

US 2005/0248113 A1 Nov. 10, 2005

(51) Int. Cl.
B62D 21/00 (2006.01)

(52) U.S. Cl. .................... 280/781; 280/788; 180/311

(58) Field of Classification Search ......... 280/124.116, 280/124.106, 124.107, 124.109, 781, 788, 280/793, 794, 124.156, 785, 789, 797, 790, 280/800; 296/204; 180/793, 311; *B62D 21/00, B62D 21/02, 21/08*

See application file for complete search history.

(56) References Cited

U.S. PATENT DOCUMENTS

| 1,708,217 | A | * | 4/1929 | Fraser | ................. | 280/124.166 |
| 1,826,730 | A | * | 10/1931 | Causan | ................. | 280/788 |
| 1,886,940 | A | * | 11/1932 | Causan | ................. | 280/788 |
| 2,337,281 | A | * | 12/1943 | Sherman | ................. | 280/794 |
| 2,478,647 | A | * | 8/1949 | Watts et al. | ................. | 105/72.2 |
| 2,577,760 | A | * | 12/1951 | Hickman | ................. | 280/124.143 |
| 2,676,030 | A | * | 4/1954 | Sherman | ................. | 280/797 |
| 2,865,652 | A | * | 12/1958 | Easton | ................. | 280/124.107 |
| 3,528,374 | A | * | 9/1970 | Wickens | ................. | 105/168 |
| 5,074,587 | A | * | 12/1991 | Schwede et al. | ................. | 280/781 |
| 5,417,454 | A | * | 5/1995 | Adams | ................. | 280/794 |
| 6,129,367 | A | * | 10/2000 | Bublies et al. | ................. | 280/124.107 |
| 6,869,136 | B2 | * | 3/2005 | Igarashi et al. | ................. | 296/204 |
| 2005/0082814 | A1 | * | 4/2005 | Ramsey | ................. | 280/793 |

FOREIGN PATENT DOCUMENTS

JP  5-84506  11/1993

* cited by examiner

*Primary Examiner*—Ruth Ilan
(74) *Attorney, Agent, or Firm*—Gifford, Krass, Groh, Sprinkle, Anderson & Citkowski, P.C.

(57) ABSTRACT

The present invention provides a device for reinforcing the rear end of a vehicle having a ladder-type frame. The device includes a first bar that is adapted to be secured between the left side rail and right suspension attachment of the vehicle frame and a second bar adapted to be secured between the right side rail and left suspension attachment such that the first and second bars are mounted to the frame in a crosswise fashion with respect to each other between the side rails. The device is mounted adjacent the rear of the vehicle frame whereby torsional stiffness and rigidity can be added to the rear of the frame and lateral deflection of the suspension attachments that occurs during aggressive driving is sharply minimized.

6 Claims, 2 Drawing Sheets

TENSION SHACKLE X-BRACE

FIELD OF THE INVENTION

The present invention relates to automotive vehicle frames and more particularly to a reinforcement device for use with ladder-type frames such as those used on pick up trucks, SUVs, and the like to enhance torsional stiffness and reduce compliance of the suspension attachment points.

BACKGROUND OF THE INVENTION

It has been known that vehicle ladder-type frame constructions have an inherent weakness with regard to torsional stiffness and rigidity. Although the ladder-type frame is good for carrying direct loads, it handles poorly due to its lack of torsional stiffness and therefore can perform poorly during aggressive on-road driving or when subject to severe forces from off-road driving. It is also known that large lateral deflections may occur at the leaf spring hangers or other suspension attachment points when vehicles having the ladder-type frame are subjected to such type of aggressive driving. These types of deflections can result in poor suspension feedback to the driver, and in severe cases may lead to substantial vehicle damage as well as possible, vehicle rollover due to instability.

SUMMARY OF THE INVENTION

The present invention seeks to provide a device for reinforcing the ladder type vehicle frame, particularly for a pickup truck, SUV or similar vehicle having a ladder-type frame, to enhance the torsional stiffness of the frame adjacent the rear end of the vehicle. The ladder-type frame includes two longitudinal parallel side rails or beams upon which the suspension and engine are mounted such that the beams operate as carriers for these loads and others. Suspension attachments are also disposed on the side rails of the frame for mounting members of the vehicle suspension, such as leaf springs, coil springs, shock absorbers, lateral links, longitudinal links, and the like.

The reinforcement device as according to the invention includes a first bar removably secured between the left side rail and the right suspension attachment wherein the first bar descends diagonally in a direction away from the left rear end of the vehicle frame to the lower end of the right suspension attachment.

A second bar is removably secured between the right side rail and the lower end of the left suspension attachment in a manner similar to the first bar such that the first and second bars are arranged crosswise with respect to each other between the side rails. Accordingly, the second bar also descends diagonally in a direction away from the right rear end of the vehicle frame as mounted between the right side rail and the left suspension attachment.

As described, the device for reinforcement of a ladder-type frame of a vehicle is provided which adds torsional rigidity to the frame and rear suspension for aggressive driving or off-roading.

BRIEF DESCRIPTION OF THE DRAWINGS

A better understanding of the present invention will be had upon reference to the following detailed description when read in conjunction with the accompanying drawings in which like parts are given like reference numerals and wherein.

DETAILED DESCRIPTION OF THE INVENTION

The present invention provides a device that is attachable to a ladder-type vehicle frame to enhance the structural rigidity of the frame and to minimize the magnitude of lateral deflections that occur at the suspension attachments when the vehicle is used in off-roading or aggressive driving. The device is an advantageous alternative to providing additional frame cross-members which increases the vehicle mass and the cost of manufacturing. The device is adapted to be selectively attachable to the vehicle and is formed from a lightweight high strength material operative to enhance torsional rigidity without substantially increasing the mass and cost of the vehicle.

Figure 1:
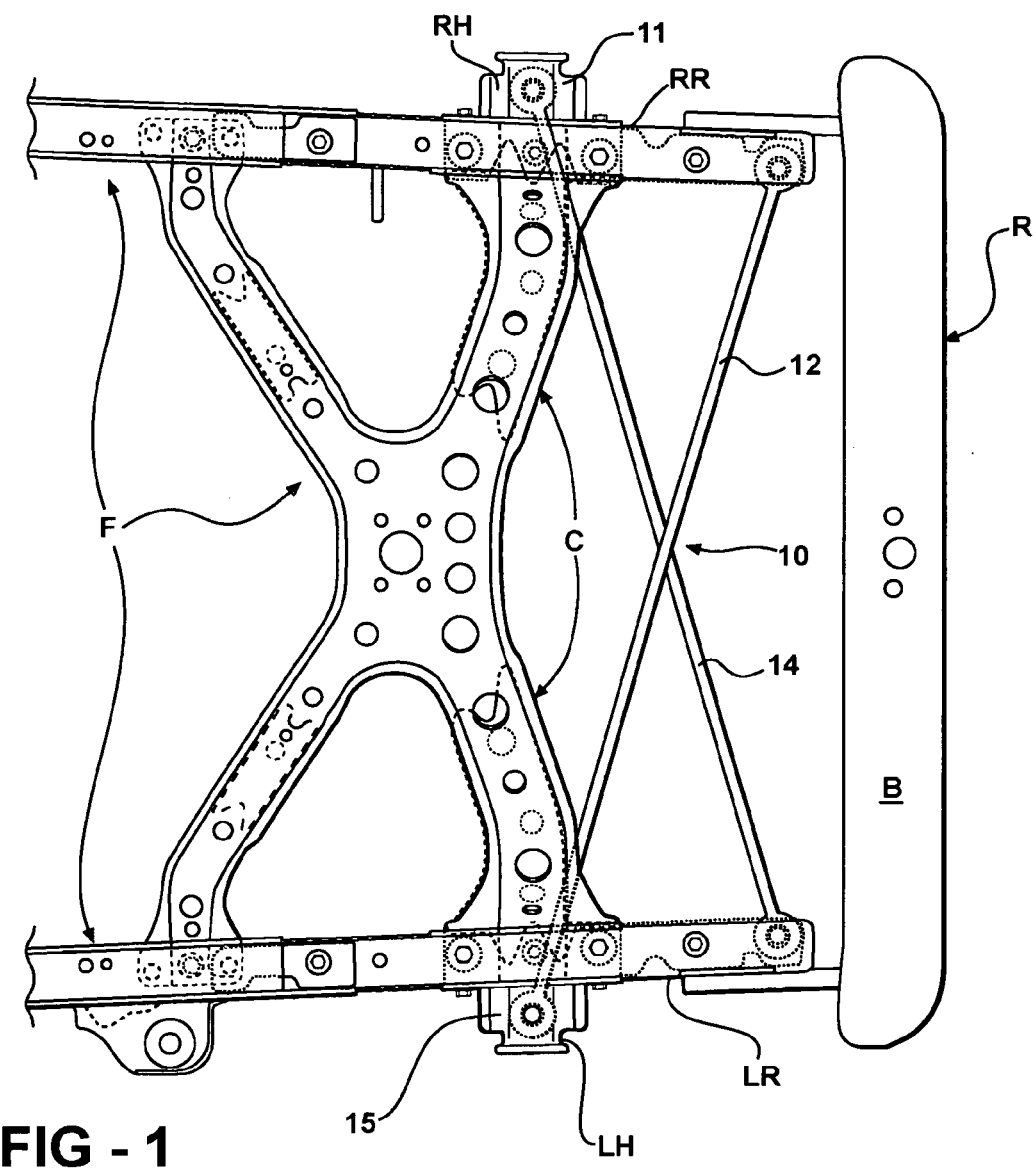
FIG. 1 illustrates a plan view of the device for reinforcing a ladder-type vehicle frame as according to the invention.

Referring now to FIG. 1, the device 10 for reinforcing the ladder-type frame F of a vehicle is provided being disposed at the rear end R of the ladder-type frame F of a vehicle.

Illustratively, a ladder-type frame F includes left and right-side rails (LR, RR) provided as two longitudinal parallel beams upon which the engine transmission, suspension and other vehicle components are mounted. Cross-members C are provided for bonding the left and right side rails together and for providing additional mounting surfaces for vehicle components. As further illustrated, the ladder-type frame F includes left and right suspension attachments (LH, RH) disposed near the rear end R of the vehicle, particularly near where the rear wheel wells would be disposed. The suspension attachments extend downward and perpendicular to the ladder type frame F and terminate at free ends 11, 15. A bumper B is attached to the extreme rear end of the ladder-type frame F of FIG. 1 to better illustrate the mounting point of the device 10 as according to the invention.

The device 10 for reinforcement of the rear end of a vehicle frame F having left and right side rails (LR, RR) and left and right suspension attachments (LH, RH) includes a first bar 12 removably secured between the right side rail RR and a lower end 15 of the left suspension attachment LH. The first bar 12 descends diagonally in a direction D away from the rear end R of the vehicle frame F adjacent where the bumper B is mounted.

Similarly, a second bar 14 is removably secured between the left side rail LR and the lower end 11 of the right suspension attachment RH in a manner that results in the first 12 and second 14 bars being arranged crosswise with respect to each other between the left and right side rails (LR, RR). The opposing ends of the first and second bars 12 and 14 are fixedly attached to the frame F using conventional fasteners known to those skilled in the art as being suitable for such purpose.

The first and second bars 12,14 are preferably formed of a high strength lightweight material adapted to withstand the rigors of aggressive driving or off-roading without being damaged and without substantially increasing the overall mass of the vehicle framework. When disposed on the vehicle, the device 10 for reinforcement of the rear end of a vehicle frame F adds torsional stiffness to the frame such that lateral deflections of the suspension attachments are reduced under stressful driving conditions thus minimizing damage to the vehicle as well as risk of accident.

As mentioned above, the device 10 is preferably formed of a high strength lightweight material such as sheet steel, tube steel, steel alloys, magnesium alloys, titanium, titanium alloys, aluminum, aluminum alloys or metal matrix composites. It is appreciated, however, that other high strength lightweight materials may be suitable for such purpose that may illustratively include polymer matrix composite materials and carbon fiber composite materials.

Figure 2:
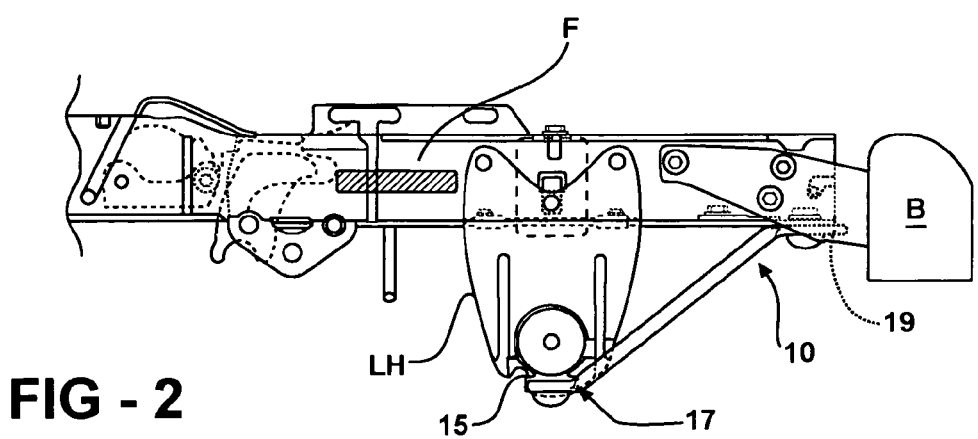
FIG. 2 illustrates a left side view of the reinforcing device as according to the invention.

With reference to FIG. 2, a left-side view of a ladder-type frame F being disposed with the device 10 for reinforcement of the rear end of a vehicle is illustrated. FIG. 2 generally illustrates the manner in which the first and second bars 12,14 descend crosswise between the left and right-hand side rails (LR, RR) in a diagonal fashion away from the rear end R of the frame F where the bumper B is disposed. The crosswise attachment of the bars between the side rails and suspension attachments provides increased stiffness at the suspension attachments such that lateral deflections of the leaf spring hangers are minimized.

For example, if the left suspension attachment LH attempts to deflect outward, the first bar 12 disposed between the right side rail RR and left suspension attachment LH would attempt to translate the deflection to the right side rail RR. However, the cross members C of the ladder type frame F operate to prohibit such a deflection at the right side rail therefore the deflection at the left suspension attachment LH is likewise prohibited or at least sharply minimized.

FIG. 2 also illustrates a difference of the material thickness and/or material mass between the device 10 and the vehicle frame F. This is shown to exemplify that a preferred embodiment of the device 10 would not increase the vehicle or frame mass as would result from the use of conventional means for reinforcing ladder-type frames wherein additional cross-members C are added between the side rails which also adds to the cost to the vehicle.

Figure 3A:
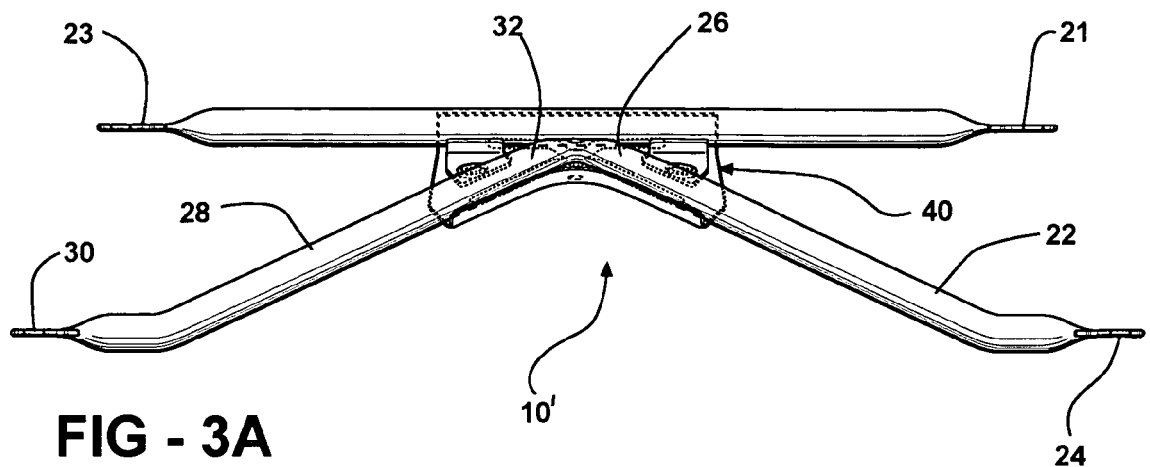
FIGS. 3A-3C illustrate an alternative embodiment of the reinforcing device for a ladder-type vehicle frame as according to the invention.
Figure 3B:
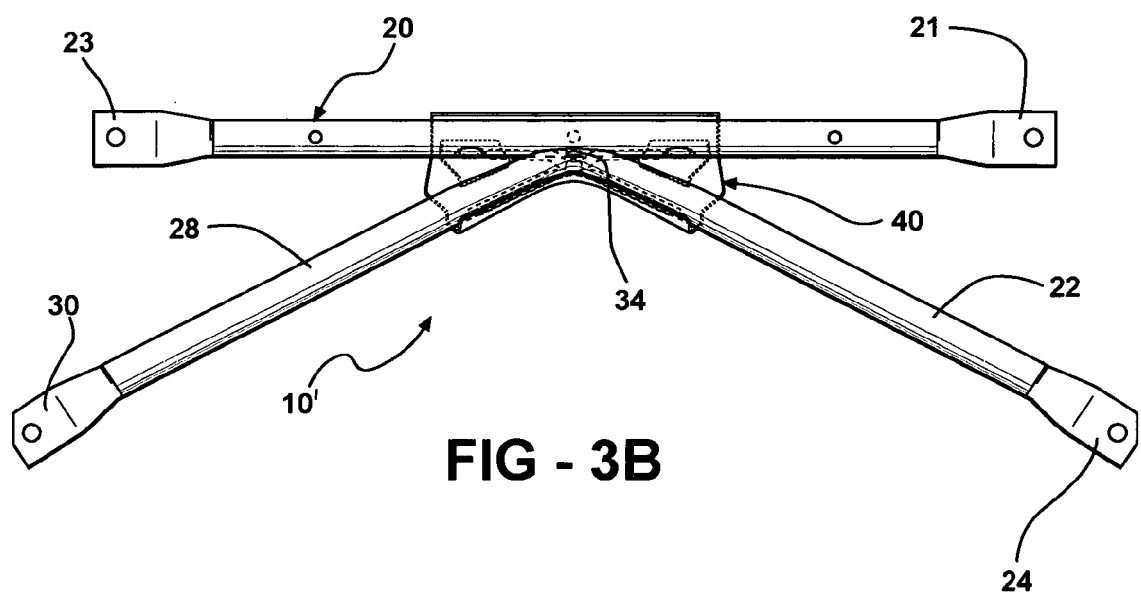
Figure 3C:
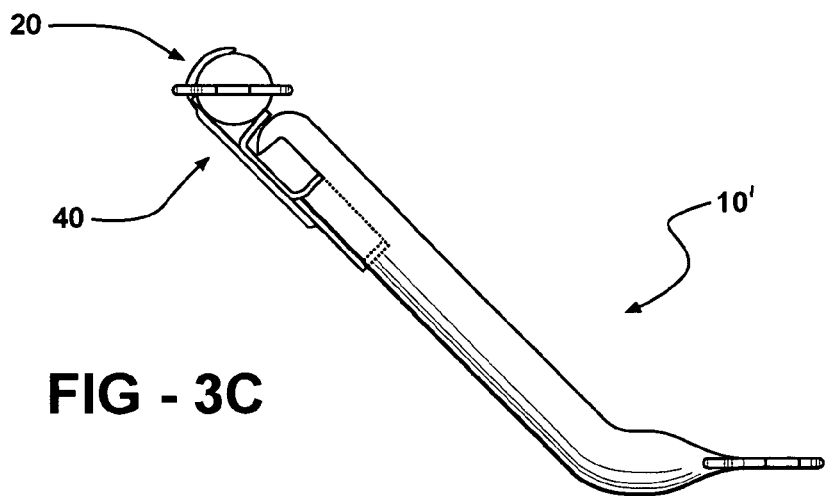

Referring now to FIGS. 3A and 3C, an alternative embodiment 10' of the device for reinforcement of a ladder-type frame F of a vehicle is illustrated. FIG. 3A illustrates a front view of the alternative embodiment device 10' that is preferably formed of a high strength lightweight material which may include stamped portions, cast portions, or portions molded from high strength lightweight materials used in processes known to those skilled in the art. FIGS. 3B and 3C illustrate top and side views of the alternative embodiment device 10' as according to the invention.

Referring to FIG. 3B, a first bar 20 is selectively attachable between the left and right side rails of the vehicle adjacent the vehicle's rear end. The first bar 20 is attached such that it extends substantially perpendicular between the left and right side rails of the frame.

A left tie bar 22 includes a first end 24 that is attachable to the left suspension attachment of the ladder-type frame and a second end 26 disposed at a midpoint of the first bar 20. Similarly, a right tie bar 28 includes a first end 30 that is attachable to the right suspension attachment of the vehicle frame and a second end 32 attachable to the midpoint of the first bar 20 at or adjacent the second end 26 of the left tie bar 22.

With reference to FIGS. 2 and 3C, it is shown that the left and right tie bars 22 and 28 descend diagonally in a direction away from the rear end of the vehicle frame in a manner best illustrated in FIG. 2. FIG. 3B illustrates opposing ends 21 and 23 of the first bar 20 are provided as flanged portions that have fastening apertures disposed therein for receiving a fastening means for securing the first bar 20 between the left and right side rails. The first ends 24 and 30 of the left and right tie bars include similarly formed flanged portions and fastening apertures for securing the second ends of the tie bars to the left and right suspension attachments accordingly. As best illustrated in FIG. 2, the flanged portions 17, 19 lay planar parallel to the horizontal plane of ladder type frame F whereby fastening of the device 10, 10' to the frame F accomplished efficiently and conveniently. It is appreciated that the left and right tie bars may be formed of one bar wherein the second ends 26 and 32 are formed together such that a vertex 32 is provided that is attachable to the midpoint of the first bar 20.

With reference again to FIGS. 3A and 3C, there is illustrated a weld plate 40 which operates to secure the first bar 20 to the ends 26 and 32 of the left and right tie bars 22 and 28. The weld plate 40 is preferably formed of a similar material as the material used to form the reinforcing device 10'; however, it is appreciated that other materials and means for joining the first bar 20 and the left and right tie bars 22 and 28 may be resorted to without exceeding the scope of the invention.

From the foregoing, a device for reinforcing the rear end of a vehicle having a ladder-type frame is provided. Having described the invention in detail, however, it is appreciated that other embodiments or modifications of the invention may become apparent to those skilled in the art without exceeding the scope of the invention as defined in the appended claims.

We claim:

1. A device for reinforcement of a rear portion of a vehicle frame having left and right side rails and left and right suspension attachments, each of the suspension attachments having a lower end that is vertically spaced apart from the side rails, said device comprising:
   a first bar secured between the right side rail and the lower end of the left suspension attachment; and
   a second bar secured between the left side rail and the lower end of the right suspension attachment wherein the first and second bars are arranged crosswise with respect to each other between the side rails,
   the first bar descending diagonally in a direction away from the rear portion of the vehicle between the right side rail and the lower end of the left suspension attachment,
   the second bar descending diagonally in a direction away from the rear portion of the vehicle frame between the left side rail and the lower portion of the right suspension attachment.

2. The device of claim 1 wherein the vehicle frame is a ladder type frame having a cross member extending between and interconnecting the left and right side rails, the left and right side rails being substantially parallel to each other.

3. The device of claim 1 being formed of a high strength lightweight material.

4. The device of claim 3 wherein said high strength lightweight material is a material selected from the group consisting of sheet steel, tube steel, steel alloys, magnesium alloys, titanium, titanium alloys, aluminum, aluminum alloys and metal matrix composites.

5. The device of claim 3 wherein said high strength lightweight material is formed of polymer matrix composite material.

6. The device of claim 3 wherein said high strength lightweight material is formed of carbon fiber composite material.

* * * * *